April 11, 1961  H. B. WAGNER  2,978,782
MOLDING AND EXTRUSION
Filed Feb. 10, 1958

{Cement
 methyl Cellulose
 CaCl₂, Na₂SO₄, etc.
Shaped
  Heated to gel mass
  Remove gelled mass
        Cement not set
  Cure cement to
        hardmass INVENTOR.
HERMAN B. WAGNER
BY
Francis W Parker Jr.

United States Patent Office 2,978,782
Patented Apr. 11, 1961

2,978,782

MOLDING AND EXTRUSION

Herman B. Wagner, Metuchen, N.J., assignor to Tile Council of America, Incorporated, a corporation of New York Filed Feb. 10, 1958, Ser. No. 714,180

6 Claims. (Cl. 25—155)

This invention relates to molding and extrusion and more particularly to the rapid formation of hydraulic cement type compositions using either the molding or extrusion techniques.

Hydraulic cements are relatively inexpensive materials and possess many desirable properties in their hardened form. They have a high degree of hardness and are abrasion resistant. They are nonflammable, have high strength and are resistant to insect and rodent attacks.

Hydraulic cement base-water compositions can be used to fill cavity molds and initially fluid compositions will harden and permit removal of the solid article from the mold. The article cannot be removed from the mold until the hydraulic cement has solidified to the required extent. This ordinarily necessitates a residence time of at least several hours in the mold. Because of the slow solidification of hydraulic cement it has not been practical heretofore to form hydraulic cement shapes by an extrusion process.

There are many advantages to rapid molding and extruding of hydraulic cement articles. In the case of molding hydraulic cement articles, a rapid process offers an economy of equipment such as molds. In the case of extrusion there is not only the aspect of economy but a practical solution to the problems of the extrusion of hydraulic cement composition objects would open a new field.

According to this invention a hydraulic cement composition is supported during the period of transition from liquid to solid by an additive having a faster rate of gel formation when the hydraulic cement, and properly controlling the rate of gel formation of the additive. Methyl cellulose may be mixed with the hydraulic cement composition and the mixture heated to gel the methyl cellulose which supports the composition out of the mold or after being extruded.

A primary object of this invention is to provide more rapid processes for the forming of articles of hydraulic cement compositions.

Another object of the invention is to provide a rapid method for molding hydraulic cement compositions.

Still another object of the invention is to provide a process for extruding forms of hydraulic cement compositions.

Other and incidental objects of the invention will become apparent after a study of the specification considered in connection with the accompanying drawing wherein.

Figure 1:
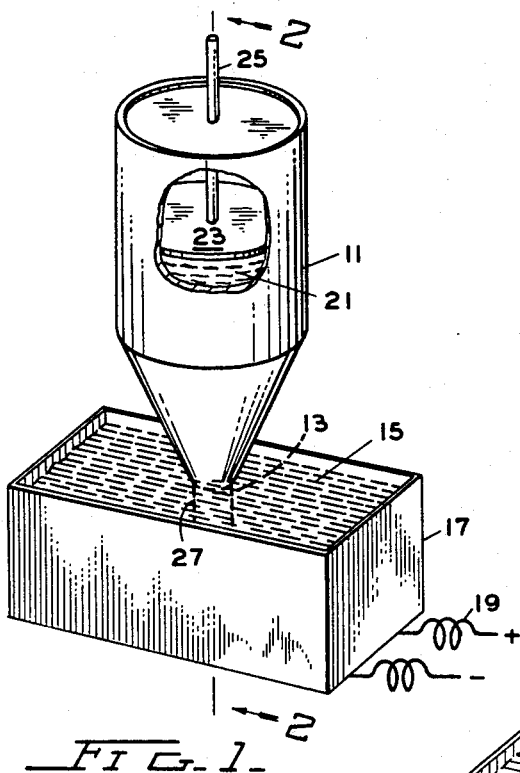
Figure 1 illustrates the carrying out of the teachings of the present invention in one of its forms, that is, by the extrusion process.

Under ordinary circumstances the transition of hydraulic cements from liquid to solid form involves the slow processes of ion-hydration, salt-solution, and gel-formation. Initial set is a consequence of the ion-hydration with the reaction and consumption and chemical binding of a portion of the water present. Hardening of the cement is the result of precipitation to form the cement gel structure. Thus, from a general standpoint, the production of a hardened cement involves these consecutive steps of ion-hydration, salt-solution and gel-precipitation. Because of the relative slowness of these processes the mass remains in a fluid, or semi-fluid condition for considerable time.

Is is the initial lack of rigidity that has heretofore made the production line molding or extrusion of hydraulic cement objects slow and uneconomical. By introducing methyl cellulose into the water-phase, shaping and heating the mass to gel the methyl cellulose solution the gelled methyl cellulose solution provides a temporary supporting structure during the preliminary cement hydration period.

A further function of the methyl cellulose solution is the maintenance of a high viscosity after the temperature of the cast article or extrusion has fallen below the gelation temperature of the aqueous phase. In this way a further period of dimensional stability is imposed upon the mass, thus providing an additional period of time for the cement-hardening reactions. Additional features of the mechanism involved in this process concern the effect of the initial hydration reaction in making a portion of the water unavailable to the methyl cellulose solution, thus further concentrating and increasing the viscosity of this solution. This in turn more effectively exerts its stabilization effect during the cooling cycle.

Increase in viscosity of the aqueous phase does not materially effect ion-mobility relative to that in ordinary water and for practical purposes does not affect the rate of the hydration, solution, gel-formation steps of the hydraulic cement hardening process.

By using compositions incorporation hydraulic cements, methyl cellullose and water, together with the effecting of elevated temperatures after such compositions have been molded or extruded, a rapid solidification is obtained. This initial solidification, which is the result of gelation of the aqueous solution of methyl cellulose persists for a period required for initial set of the hydraulic cement itself. In this way there has been provided a rapid conversion of the hydraulic cement composition from fluid to solid, and a transition from the methyl cellulose gel to the Portland cement gel, a rigid structure being maintained through all.

The minimum temperature required for initial solidification of the fluid mass corresponds to the gelation temperature of the methyl cellulose solution and thus depends upon the concentration of the methyl cellulose in the aqueous phase, the molecular weight of the methyl cellulose employed, and upon the presence or absence of certain other water soluble components in the mass. The minimum gelation temperature of the methyl cellulose may range from as low as 88 degrees Fahrenheit to as high as 148 degrees Fahrenheit. From the standpoint of obtaining more rapid and efficient operation of the process, however, temperatures between about 180 degrees Fahrenheit and 212 degrees Fahrenheit are optimum.

The invention may be practiced by preparing a viscous slurry consisting of the hydraulic cement, methyl cellulose, and water as essential components, along with other constituents such as sand, asbestos fiber, fillers, and materials commonly used in hydraulic cement base compositions.

In the various figures of the drawing the same numeral is used to designate similar elements.

Figure 2:
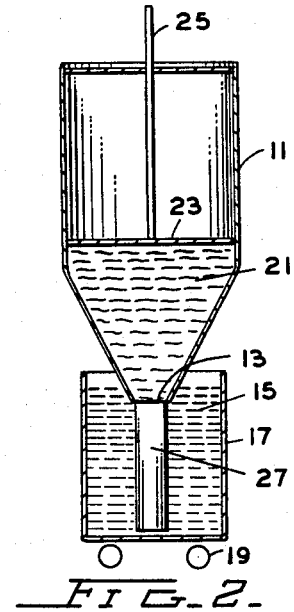
Figure 2 shows a cross section of Figure 1.

In Figures 1 and 2 of the drawing there is shown one form of extrusion molding apparatus. A hopper 11 has a die hole 13 at its lower end. The die hole 13 is submerged in the liquid 15 in the container 17. The fluid 15 is heated by the electric heating element 19 which extends beneath the container 17.

The hydraulic composition in the form of a slurry 21 is poured into the hopper 11. A piston 23 having a handle 25 is used to force the slurry down through the die hole 13 and into the liquid 15 which has been heated to about 200 degrees Fahrenheit. The heated liquid causes the methyl cellulose to gel immediately and form a rod-like member 27. The rod-like member may be made in any desired length by breaking it off at the die hole 13 or later cutting it.

Figure 3:
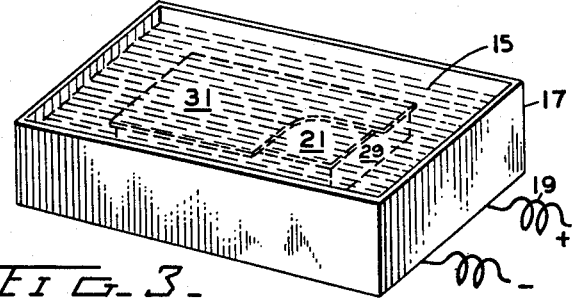
Figure 3 illustrates another way of practicing the present invention, that is, by heating the mold be heat conduction.

Turning now to Figure 3, there is shown another form of the invention in which the slurry 21 is placed in a mold 29 which is covered with lid 31 and immersed in a liquid 15 in container 17. Heating element 19 is employed to maintain the temperature of the liquid 15 at the necessary temperature to cause the methyl cellulose to gel and enable the removal of the object being molded from its mold 29.

Figure 4:
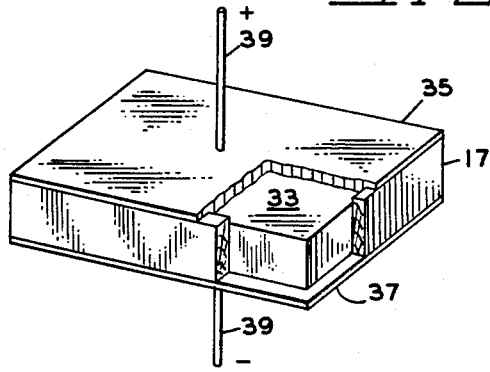
Figure 4 shows still another way of practicing the invention, that is, heating by electric current flowing through the hydraulic cement composition to raise its temperature.

In Figure 4 there is shown another form of the invention wherein the hydraulic cement composition includes a material such as calcium chloride, sodium sulfate or other electrolyte, which makes the slurry 33 electrically conductive. The mold 17 includes a metal top 35 and a metal bottom 37 to which are connected the electrical power leads 39. When the mold 17 is filled with the conductive slurry 33 and the current is passed through the conductive slurry 33, the temperature of the conductive slurry 33 is elevated to the point at which the methyl cellulose gels. The cast object may then be removed from the mold without waiting for the hydraulic cement to set.

Figure 5:
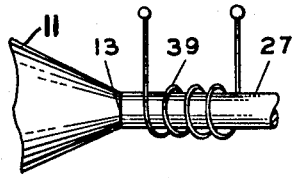
Figure 5 illustrates still another form of the invention involving the use of heating the hydraulic cement composition by induction as it leaves the extrusion die hole.

Figure 5 shows the hopper 11 in a horizontal position. The pressure in the hopper 11 causes the hydraulic cement compositions to be extruded through the die hole 13 to form a rod-like member 27 as described for Figures 1 and 2. In the form of the invention shown in Figure 5 the hydraulic cement composition must be electronically conductive through incorporation of carbon, magnetite, or silicon carbide in the hydraulic cement composition.

By passing an alternating current through coil 39 a magnetic field is set up in the rod-like member 27 and due to the eddy currents produced in the rod-like member 27, sufficient heat is generated to raise the temperature of the rod-like member to cause the methyl cellulose to gel and provide rigidity until the hydraulic cement sets.

The following examples are for illustrative purposes showing some forms of the invention which have been successfully practiced.

*Example 1*

Nine pounds of gray Portland cement were mixed into three and one-quarter pounds of a 3% solution of 400 centipoise methyl cellulose dissolved in water. This slurry was then poured into a light plaster of Paris mold lubricated with petroleum jelly and previously cast from a 6" x 6" object. After filling this mold it was immersed for about three minutes in a water bath at 200 to 210 degrees Fahrenheit; the mold was then removed from the bath and the now solidified casting taken from the mold. The casting, now reproducing in Portland cement the shape of the object, was placed for several days in a humid curing chamber to complete the hardening of the Portland cement article.

*Example 2*

Nine pounds of gray Portland cement were mixed into three pounds of a 3% solution of 400 centipoise methyl cellulose dissolved in water. This slurry was then extruded downward through a circular die of diameter equal to ¼" into a mineral oil bath at 200 degrees Fahrenheit. The rate of extrusion was approximately ½ linear inch per second and the extruded cylinder was cut after each ten inch length. It was possible then to lift each section from the bath and cure for several days as in Example 1, to yield hard, rigid Portland cement rods.

*Example 3*

Four hundred grams of white Portland cement were mixed into one hundred forty grams of an aqueous solution that was 2% with respect to 1500 centipoise methyl cellulose and 1.5% with respect to calcium chloride. A portion of this slurry was then placed between two 4" x 4" x ⅛" brass plates separated, at a distance of ⅜" from one another, by an open quadrangle of wood, each side also of length equal to four inches. (In this way an enclosure of the shape of a rectangular parallelepiped of dimension approximately 4" x 4" x ⅜" was formed.) An alternating 60 cycle current of about 90 volts was applied across the ⅜" span of the slurry, each brass plate thus constituting an electrode. After about two minutes the circuit was interrupted and the brass plates separated to remove the hot and now solid Portland cement piece. This was then further cured as described above.

Hydraulic cement as used throughout the specification may be defined as a cement that hardens under water, or by reaction with water. Good examples of hydraulic cements are Portland cement, high alumina cement, pozzuolana cement, iron ore or slag cement.

Having thus described the invention what is claimed is:

1. A process for producing shaped articles of hydraulic cement in which the residence time in a shaping means is substantially reduced, which comprises preparing a viscous mixture comprising hydraulic cement, water and methyl cellulose, introducing said mixture into a shaping means, heating the viscous mixture to a temperature of about 88° to 212° F. for a period of time sufficient to jell the methyl cellulose to thereby provide rigidity to the viscous mixture but insufficient to set the Portland cement, thereby giving a permanency to the shape imparted to said viscous mixture by said shaping means, removing the jelled shaped mixture from the shaping means and subsequently curing the jelled shaped mixture out of the mold for a period of time sufficient to set the hydraulic cement therein to thereby form a hard, rigid article.

2. A process, as set forth in claim 1, wherein the shaping means is a mold.

3. A process, as set forth in claim 1, wherein the shaping means is a die.

4. A process for producing shaped articles of hydraulic cement in which the residence time in a shaping means is substantially reduced, which comprises preparing a viscous mixture comprising hydraulic cement, water and methyl cellulose, introducing said mixture into a shaping means, heating the viscous mixture to a temperature of about 180° to 212° F. for a period of time up to about three minutes to jell the methyl cellulose to provide rigidity to the viscous mixture but insufficient to set the Portland cement, thereby giving a permanency to the shape imparted to said viscous mixture by said shaping means, removing the jelled shaped mixture from the shaping means and subsequently curing the jelled shaped mixture out of the mold for a period of time sufficient to set the hydraulic cement therein to form a hard, rigid article.

5. A process for producing shaped articles of hydraulic cement in which the residence time in a shaping means is substantially reduced, which comprises preparing a viscous mixture comprising hydraulic cement, water and from about 0.2 to 1.2 percent of methyl cellulose, based on the weight of hydraulic cement, introducing said mixture into a shaping means, heating the viscous mixture to a temperature of 180° to 212° F. for a period of time up to about three minutes to jell the methyl cellulose, thereby giving a permanency to the shape imparted to said viscous mixture by said shaping means, removing the jelled shaped mixture from the shaping means and subsequently curing the jelled shaped mixture out of the mold to set the hydraulic cement to form a hard, rigid article.

6. The process of claim 5 in which the jelled shaped mixture is cured out of the mold for a period of several days to set the hydraulic cement therein, thereby forming a hard, rigid article.

References Cited in the file of this patent

UNITED STATES PATENTS

| | | |
|---|---|---|
| 1,370,800 | Egerton | Mar. 8, 1921 |
| 2,427,683 | Ludwig | Sept. 23, 1947 |
| 2,432,971 | Ruthman et al. | Dec. 16, 1947 |
| 2,500,866 | Ramsay | Mar. 14, 1950 |
| 2,549,507 | Mergan et al. | Apr. 17, 1951 |